United States Patent [19]

Ogawa et al.

[11] Patent Number: 5,580,209

[45] Date of Patent: Dec. 3, 1996

[54] WRIST MECHANISM OF ARTICULATED ROBOT

[75] Inventors: Masahiro Ogawa; Shuichi Tohnai, both of Kitakyushu, Japan

[73] Assignee: Kabushiki Kaisha Yaskawa Denki, Fukuoka, Japan

[21] Appl. No.: 397,290

[22] Filed: Mar. 20, 1995

[30] Foreign Application Priority Data

Aug. 18, 1993 [JP] Japan ................... 5-49529 U

[51] Int. Cl.⁶ .................................................. B25J 17/02
[52] U.S. Cl. ...................... 414/729; 414/744.5; 901/15; 901/49
[58] Field of Search ................... 414/744.4, 744.5, 414/729, 917; 901/15, 29, 49

[56] References Cited

U.S. PATENT DOCUMENTS

| | | | |
|---|---|---|---|
| 4,551,058 | 11/1985 | Mosher | 414/917 |
| 4,639,184 | 1/1987 | Knasel et al. | 901/49 |
| 4,655,674 | 4/1987 | Kohler et al. | 901/49 |
| 4,836,742 | 6/1989 | Ishigura et al. | 901/15 |
| 5,037,267 | 8/1991 | Warner et al. | 414/917 |
| 5,054,332 | 10/1991 | Terauchi et al. | 414/917 |
| 5,222,854 | 6/1993 | Blatt et al. | 414/917 |

FOREIGN PATENT DOCUMENTS

| | | |
|---|---|---|
| 59-146774 | 8/1984 | Japan . |
| 60-11791 | 1/1985 | Japan . |
| 1-257590 | 10/1989 | Japan . |
| 2-41888 | 2/1990 | Japan . |

*Primary Examiner*—Karen B. Merritt
*Assistant Examiner*—Gregory A. Morse
*Attorney, Agent, or Firm*—Jordan & Hamburg

[57] ABSTRACT

A wrist mechanism for an articulated robot includes a first wrist link which extends on an extension of the robot arm and which is fixed to the outer peripheral portion of a rotary portion. A second wrist link is fixed to an output shaft of the rotary portion, and a third wrist link is pivotally connected to an end portion of the first wrist link so that the third wrist link can be turned. A fourth wrist link is pivotally connected to end portions of the second and third wrist links and extends parallel to the first wrist link. A work clamping device is fixed to a pivot pin of the third wrist link. A damping device is provided between the wrist and the first wrist link or second wrist link. Thus, there is provided a wrist mechanism having non-reinforced arms and a driving motor of a small load, capable of being operated at a high speed and kept safe even when the work clamping device collides with an obstruction.

9 Claims, 5 Drawing Sheets

WRIST MECHANISM OF ARTICULATED ROBOT

FIELD OF ART

The present invention relates to a wrist mechanism attached to the top end of the arm of an articulated robot for transferring a comparatively heavy workpiece between press-machines, and more particularly, to a type of wrist mechanism that is capable of keeping the attitude of the workpiece constant while it is being transferred.

BACKGROUND OF THE INVENTION

Conventionally, as a first prior art articulated robot there has been one that is shown in FIG. 5. This robot comprises a base 2 rotating on a base plate 1 about a vertical rotation axis (S-axis) by means of an S-axis drive motor 21 provided on the base plate 1; a first arm 3 rotating on the base 2 about a horizontal rotation axis (L-axis) by means of an L-axis drive motor 31 provided on the base 2 and capable of tilting forward and backward; a second arm 4 rotating at the top end of the first arm 3 about a rotation axis (U-axis) parallel to the L-axis by means of a U-axis drive motor 41 provided on the base 2; a third arm 5 rotating about a rotation axis (R-axis) extending in the longitudinal direction of the second arm 4 by means of a R-axis drive motor 51 provided on the second arm 4; a wrist portion 6 rotating about a vertical rotation axis (B-axis) perpendicular to the longitudinal direction of the third arm 5; a rotary portion 7 attached to the wrist portion 6 and rotated about a rotation axis (T-axis) perpendicular to the B-axis by means of a T-axis drive motor 71 provided on the second arm 4; and a workpiece clamp portion 81 attached to the rotary portion 7 so as to clamp a workpiece W. The second arm 4 or the third arm 5 of the articulated robot are to be especially long to expand the operating range of the robot.

Further, the R-axis, B-axis and T-axis drive motors 51, 61 and 71 are provided at the root portion of the second arm 4, and the second and third arms 4 and 5 are made hollow so that drive shafts 52, 62 and 72 can be passed through these hollowed arms to thereby rotate the third arm 5, the wrist portion 6 and the rotary portion 7. (e.g., Japanese Laid-Open Patent Publications H1-257590 and H2-41888).

In addition, in order to keep the attitude of a workpiece constant during transfer, there is a second prior art articulated robot as shown in FIG. 6. This robot is constructed so that a horizontally rotatable arm 76 is provided at an articulated portion 75, a parallelogrammatic link mechanism 77 is attached to the arm 76 which makes itself one side of the parallelogram formed by the mechanism, and a wrist horizontal swing mechanism is attached to the top end of the link mechanism 77 to allow a wrist portion 73 to swing horizontally in a way that the attitude of the wrist portion 73 is maintained by rotating the parallelogrammatic link mechanism 77 in the vertical direction. (e.g., Japanese Laid-Open Patent Publication No. 59-146774).

However, the first prior art articulated robot the has the problem that, when the second arm 4 or the third arm 5 is elongated, the drive shafts 52, 62 and 72 for rotating the wrist portion 6 and the rotary portion 7 are made longer to cause the reduction of the resonance frequency of the driving shaft resulting in a limitation to the critical number of revolutions, so cannot operate at a high speed. Further, there has also been the problem that the moment applied on the second arm 4 or the third arm 5 increases, making it necessary to increase the strength of the second arm 4 or the third arm 5 when the clamp device 8 attached to the wrist portion 6 or clamped to workpiece W interferes with any other substance. Consequently, it has not been possible to make the second arm 4 or the third arm 3 especially long.

Further, in order to keep the attitude of the workpiece constant during transfer, one may have the idea of mounting the arm 76 of the second prior art articulated robot horizontally to the wrist portion 6 of the first prior art articulated robot. But since the parallelogrammatic link mechanism 77 of the second prior art must be rotated, the drive section has to be pivotally supported which results in reducing the rigidity of the connected sections and causes the necessity of providing a heavy-weight motor for the wrist swing mechanism for swinging the wrist portion 73.

In the first prior art articulated robot and also in the combination of the first and second prior art articulated robots, the clamp device 8 having an elongated shank 82 extending from the wrist portion 6 up to the work clamp portion 81, or having the parallelogrammatic link mechanism 77 is attached to the wrist portion 6 as shown in FIG. 4(b) and, for example, when a rectangular workpiece W is clamped by the clamp device 8 and moved from a point P to a point Q, the inertia about the T-axis will be expressed by: $4 \times M \times L2 + M(a2+b2)/3$; here, M designates the weight of the workpiece, L designates the distance from the center of the wrist portion 6 to the center of gravity of the workpiece W and a, b designate the lengths of the two sides of the workpiece, respectively.

Accordingly, the inertia about the T-axis increases as the length of the clamp device increases so that the loads applied on the T-axis drive motor 71 for the wrist portion 6 and the rotary portion 7 also increase resulting in reducing the life of the speed reducer connected to the drive motor 71. Therefore, the present invention's object is to provide a wrist mechanism for an articulated robot in which only a small loads are applied on each of the drive motors and with which the robot can be operated at a high speed without reinforcing its arms.

DISCLOSURE OF THE INVENTION

The wrist mechanism of the articulated robot according to the present invention comprises: a wrist portion rotating about a pivotal axis (B-axis) arranged perpendicular to the longitudinal direction of a second arm, by means of a B-axis drive motor provided at the root portion of the second arm; a rotary portion rotating about a pivotal axis (T-axis) arranged perpendicular to the B-axis of the wrist portion and a clamp device provided at the rotary portion to clamp a workpiece; characterized in: a first wrist link tightly fixed to said wrist portion so as to extend along a line from the second arm; a second wrist link fixed to said rotary portion provided at said wrist portion; a third wrist link pivotally connected to the top end of said first wrist link; and a fourth wrist link pivotally connected to the top ends of said second wrist link and the third wrist link, and installed in parallel to the first wrist link; and a clamp device pivotally connected to the third wrist link.

Further, between the wrist portion and the first wrist link there is provided a damping device which comprises: a floating mechanism comprising: a slide portion fixed to a casing which is fixed to the wrist portion and to the first wrist link, an engagement portion which disengages the slide portion from the casing when the torque to rotate the casing relative to the slide portion exceeds a predetermined torque; comprising a return spring acting in a direction in which a predetermined relative positional relationship between the wrist portion and the first wrist link is always maintained; and a shock sensor operating when the casing and the slide portion are disengaged from each other.

Still further, between the rotary portion and the second wrist link, there is provided another damping device which comprises: a floating mechanism comprising: a guide ring fitted to the rotary portion; a support shaft fixed to the second wrist link; an engagement portion which disengages the guide ring from the support shaft when the torque between the guide ring and the support shaft exceeds a predetermined value; and a return spring acting in a direction in which a predetermined relative positional relationship is always maintained between the rotary portion and the second wrist link; and a shock sensor operating when the guide ring and the support shaft are disengaged from each other.

With the above arrangement, the first wrist link extends from the wrist portion to a point on a line that extends from the arm, and the clamp device for clamping the workpiece W is provided at the top end of the first wrist link through the third wrist link so that the operating range of the robot can be enlarged without elongating the arm.

Consequently, it is not necessary to elongate the drive shaft for the wrist portion and the rotary portion, and the decreasing of the resonance frequency is prevented. Therefore, the problem of limitation to the critical number of revolutions at the time of high-speed operation of the robot can be eliminated.

Further, as the damping devices, each comprising a floating mechanism and a shock sensor, are provided between the wrist portion and the first wrist link and between the rotary portion and the second wrist link, when an excessively large torque is applied on the wrist portion as when the workpiece or the clamp device touches to an obstacle, the overload applied on the wrist portion in the moving direction thereof is absorbed and detected.

DESCRIPTION OF THE PREFERRED EMBODIMENT

A preferred embodiment of the present invention will now be described with reference to the accompanying drawings.

Figure 1:
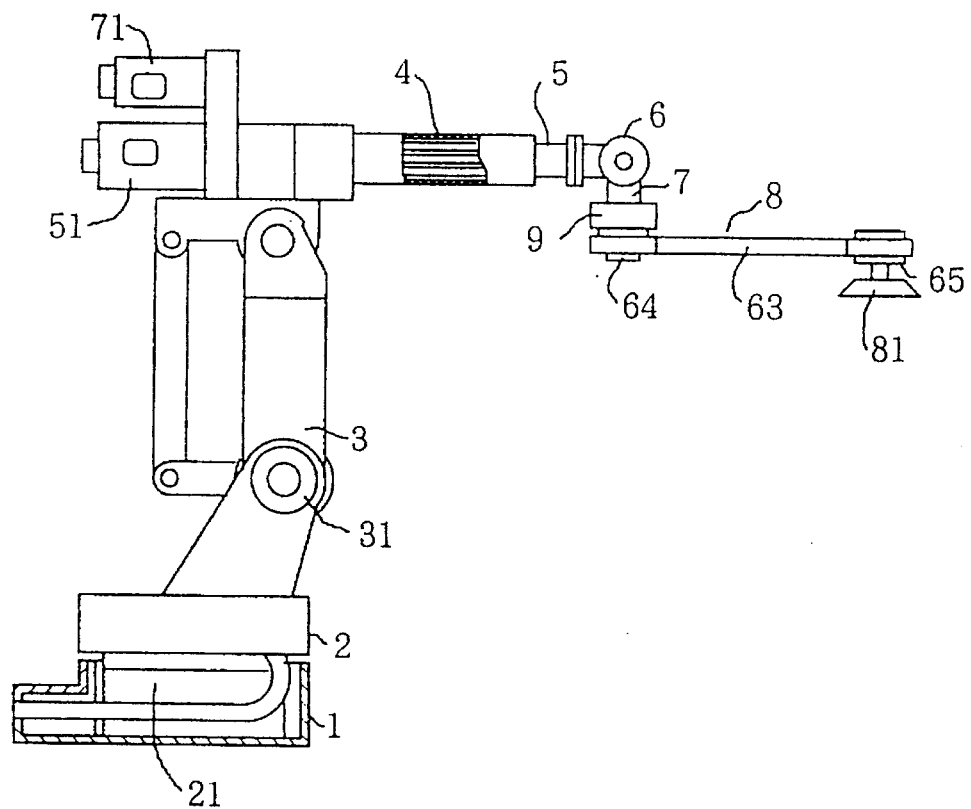
FIG. 1 is a side view of a wrist mechanism of an articulated robot according to one embodiment of the present invention.
Figure 2:
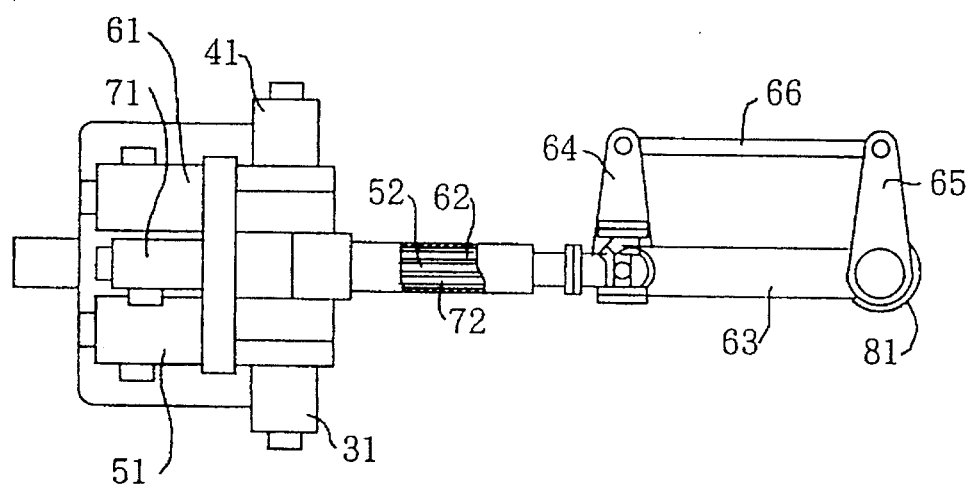
FIG. 2 is a plan view of the wrist mechanism shown in FIG. 1.

Referring to FIGS. 1 and 2, a wrist mechanism of an articulated robot according to the present invention is provided with a base plate 1, a base 2, a first arm 3, a second arm 4 and a third arm 5. Further, there is provided a wrist portion 6 rotating around a rotation axis (B-axis) which is perpendicular to the longitudinal direction of the third arm 5, by means of a B-axis drive motor 61 provided on the second arm 4, and on the wrist portion 6 there is provided a rotary portion 7 rotating around a pivoted axis (T-axis) arranged perpendicular to the B-axis, by means of a T-axis drive motor 71 provided on the second arm 4. Further, a clamp device 8 for clamping a workpiece W is attached to the rotary portion 7, an R-axis drive motor 51, the B-axis drive motor 61 and the T-axis drive motor 71 are provided at the root portion of the second arm 4.

In addition, the second arm 4 and the third arm 5 are made hollow and drive shafts 52, 62 and 72 are passed through the arms 4 and 5 so that the rotary portion 7 comprising a speed reducer capable of rotating the input shaft through the third arm 5, the wrist portion 6 and a bevel gear is rotated. This structure is substantially the same as the conventional wrist mechanism of the articulated robot.

The differences between the present invention and the conventional wrist mechanism reside in the following structure and operation of the present invention. That is, where there is no possibility of entry of an obstacle into the transfer path, a damping device 9 is omitted to simplify the structure, a first wrist link 63 extending to a point on a line of extension from the second arm 4 is firmly fixed to the outer peripheral portion 67 (a speed reducer's casing) of the rotary portion 7 and a second wrist link 64 is fixed to an output shaft 73 (an output shaft of the speed reducer) of the rotary portion 7 provided on the wrist portion 6, thereby increasing the rigidity of the connecting portions.

To the top end of the first wrist link 63 is pivotally connected to a third wrist link 65 and the top ends of both the second wrist link 64 and the third wrist link 65 there are pivotally connected to both ends of a fourth wrist link 66 which is parallel to the first wrist link 63, thereby forming a parallelogramatic link mechanism. The second wrist link 64 is so formed as to be rotated by an output shaft 73 of the rotary portion 7. At the top end of the third wrist link 65, there is fixed a work clamping portion 81 which clamps the workpiece W to a flange rotating with the third wrist link 65.

Figures 4A, 4B:
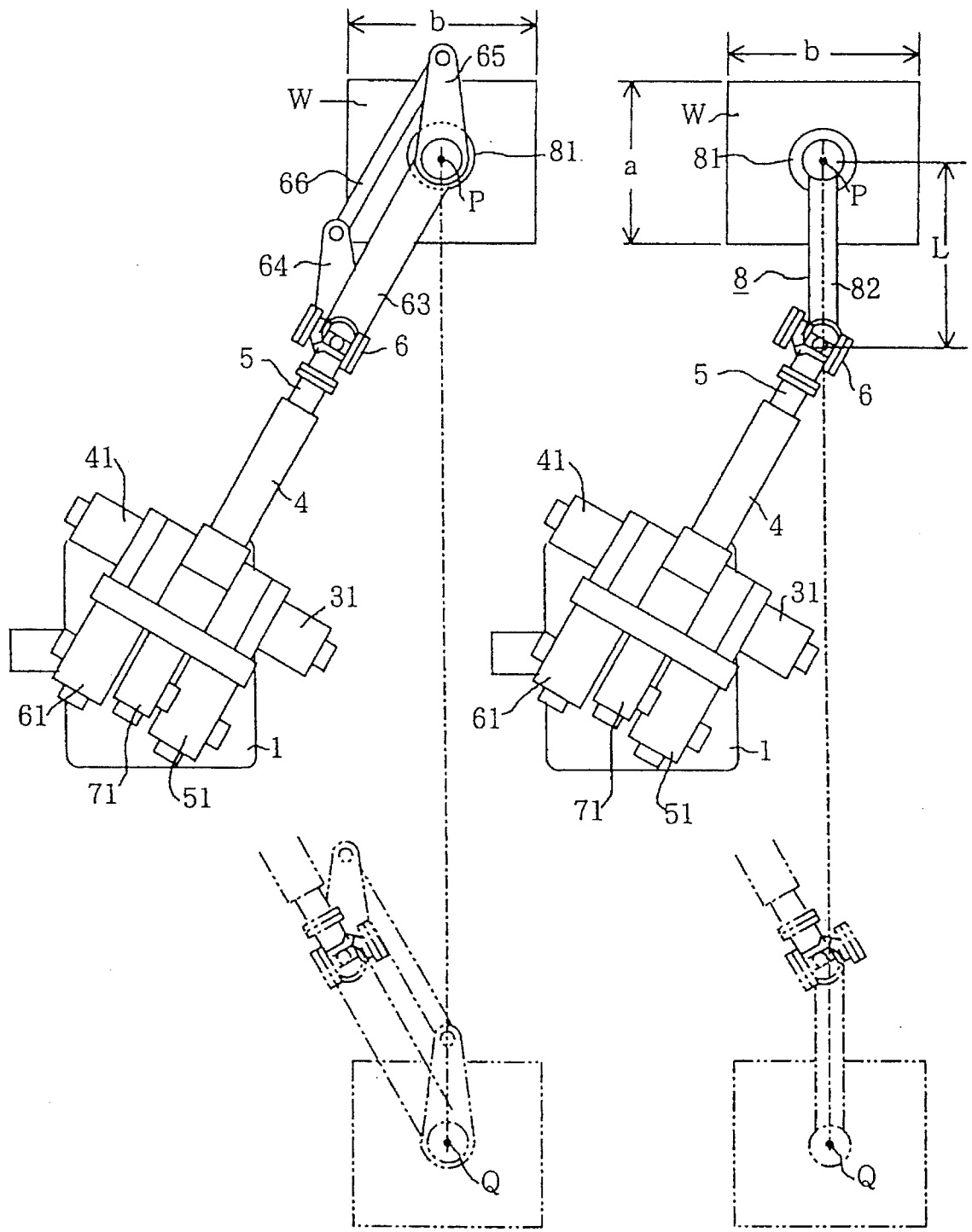
FIG. 4(a) is a plan view of the wrist mechanism of the present invention, showing how the wrist mechanism operates.
FIG. 4(b) is a plan view of a prior art wrist mechanism, illustrating how the wrist mechanism operates.
Figure 5A:
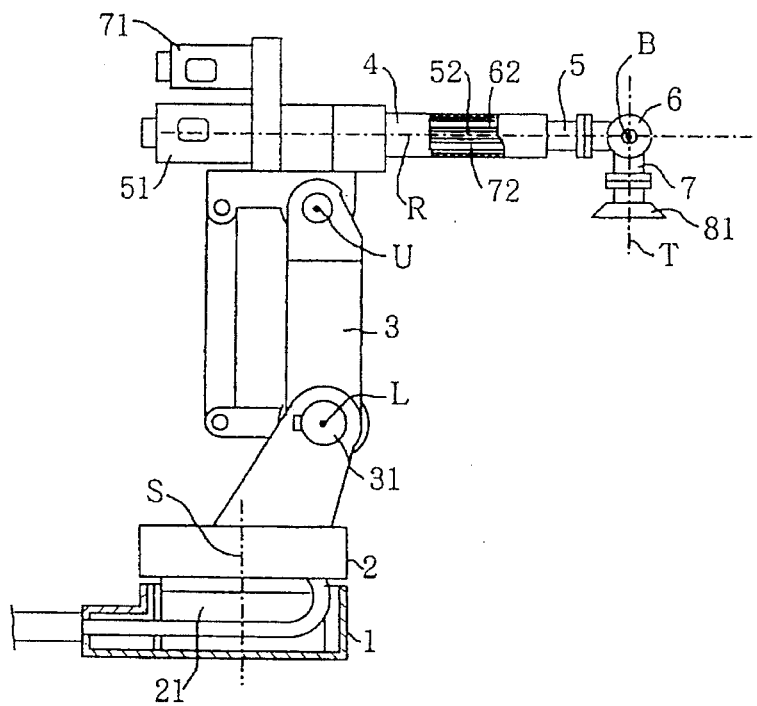
FIG. 5(a) is a side view of a first example of a prior art wrist mechanism.
Figure 5B:
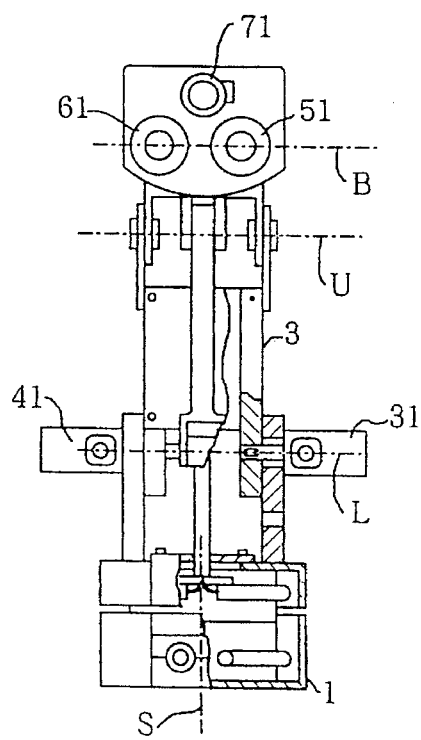
FIG. 5(b) is a front view of the wrist mechanism shown in FIG. 5(a)
Figure 6:
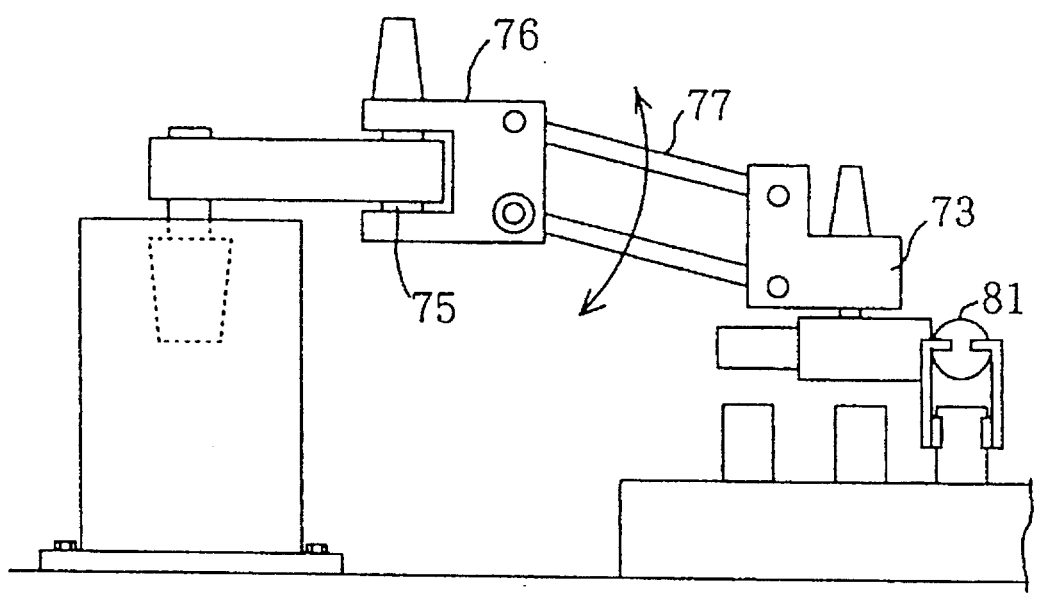
FIG. 6 is a side view of a second example of a prior art wrist mechanism.

With the above-described mechanism, when the workpiece W is transferred from the point P to the point Q, the first arm 2 and the second arm 5 are rotated and at the same time, the second wrist link 64 is rotated by the T-axis drive motor 71 causing the work clamp portion 81 to rotate through a parallelogramatic link mechanism, whereby the workpiece W clamped by the clamp device 8 can be transferred from the point P to the point Q while the attitude of the workpiece W is always directed toward a predetermined direction as shown in FIG. 4(a).

In this case, due to the arrangement where first wrist link 63 extends to a point on a line of extension from the second arm 4 and from the wrist portion 6, and the work clamp portion 81, for clamping the workpiece W rotating through the third wrist link 65, is attached to the top end of the first wrist link 63, it is possible to enlarge the operating range of the robot without extending the lengths of the second arm 4 and the third arm 5. Accordingly, the drive shafts 52, 62 and 72 need not to be enlarged. Thus, the lowering of the resonance frequency is prevented and the problem of a limitation to the critical number of revolutions taking place when the wrist mechanism is rotated at a high speeds can be eliminated.

Further, in contrast to the prior art example shown in FIG. 4(b), the inertia about the T-axis is expressed only by M (a2+b2)/3. This significant decrease of inertia is brought about because it is not affected by the distance from the wrist portion 6 to the clamp device 8, so that the load applied on the T-axis drive motor 71 is reduced.

Where the entry of an obstacle midway in the work transfer path can be expected, a damping device 9 comprising float mechanisms 92, 93 and a shock sensor 91 is disposed between the wrist portion 6 and the first wrist link 63 and between the rotary portion 7 and the second wrist link 64.

Figure 3:
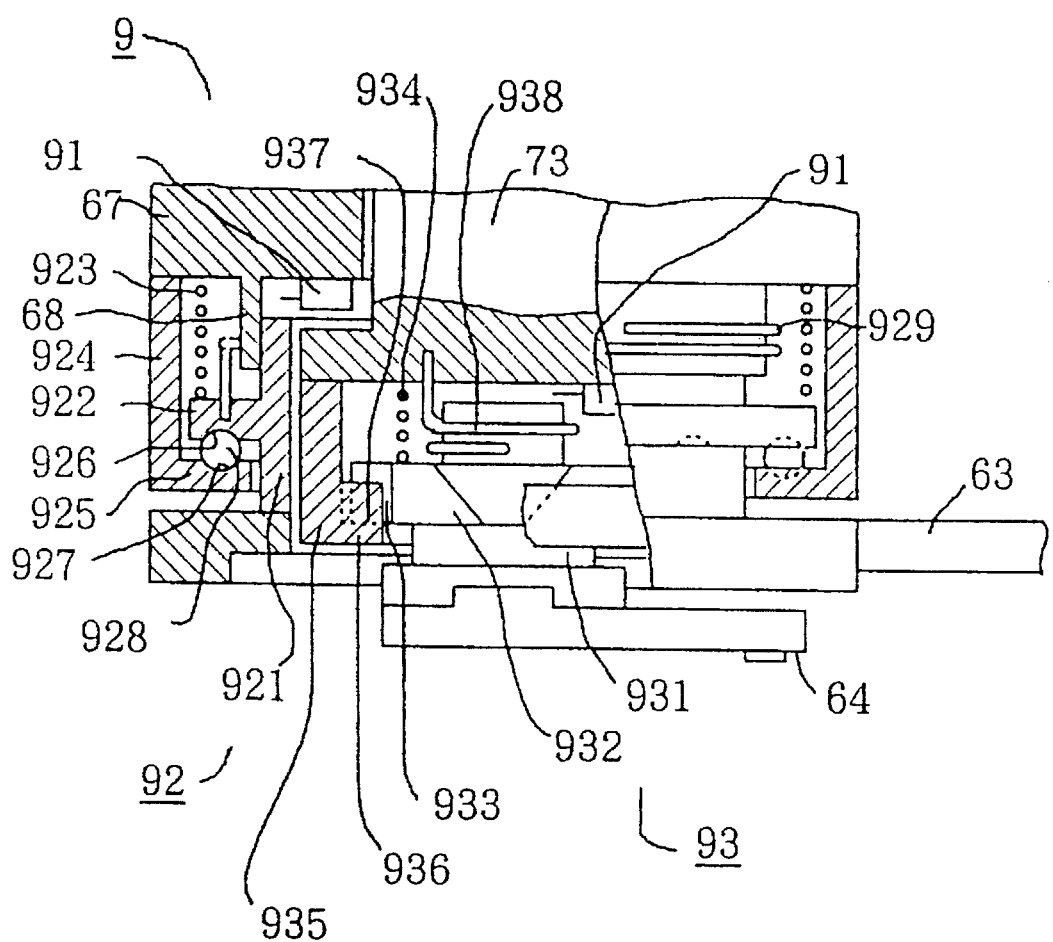
FIG. 3 is a side sectional view of a damping device used with the wrist mechanism shown in FIG. 1.

FIG. 3 is a side sectional view of the damping device 9. The floating mechanism 92 is provided with a slide portion 921 which is capable of sliding vertically within a guide 68, and the lower end of the slide portion 921 is fixed to the first wrist link 63. Further, the slide portion 921 is provided with a flange 922. Between the lower surface of the outer peripheral portion of the rotary portion 7 and the flange 922, there is provided a compression spring 923, and at the lower surface of the outer peripheral portion 67 of the rotary portion 7, there is provided a casing 924 to surround the compression spring 923. A receiving plate 925 is formed at the lower end of the casing 924 to face the lower surface of the flange 922. On the opposing surfaces of the receiving plate 925 and the flange 922, there are provided recesses 926 and 927, respectively, between which is received an engaging ball 928. Further, there is provided a coil-like return spring 929 for which both ends are fixed to the wrist portion 6 and the slide portion 921, respectively.

The other float mechanism 93 includes a support shaft 931 fixed to the second wrist link 64 at the top end of the output shaft 73 of the rotary portion 7. The support shaft 931 is attached with a disk-like flange 932 and has a plurality of projections 933 projecting from the outer periphery thereof and arranged at equal intervals in the circumferential direction with each projection having inclined surfaces on both sides, and between the top end of the output shaft 73 of the rotary portion 7 and the flange 932, there is provided a compression spring 934. Further, at the top end of the damping device 9, there is provided a guide ring 935 surrounding the flange 932, and an inwardly projecting receiving plate 936 is provided below the guide ring 935. On the surface facing the flange 932 of the receiving plate 936, there is formed a recess 937 which has the same angle of inclination as the inclined surfaces of the projections 933 so as to engage and support the latter. A coil-like return spring 938 is provided so as to have both ends fixed to the rotary portion 9 and the support shaft 931, respectively.

Where the first wrist link 63 touches to an obstacle or an excessively large torque is applied in the moving direction of the wrist portion 6, the slide portion 921 tends to rotate about the T-axis together with the first wrist link 63 relative to the wrist portion 6, against the return spring 929. In this case, the engaging ball 928, which is engaged with the recess 926 of the flange 922 and the recess 927 of the casing 924 fixed to the wrist portion 6, rises from the recesses 926 and 927 up to the upper surface of the receiving plate 925, so that the engaging ball 928 comes to roll freely, thereby allowing the first wrist link 63 to rotate about the T-axis. In this case, the slide portion 921 moves axially against the compression spring 923 by means of the engaging ball 928, thereby causing the shock sensor 91 to stop the operation of the first wrist link 63.

When the first wrist link 63 is released from its overloaded condition, the slide portion 921 rotates in the reverse direction by the action of the return spring 929, the engaging ball 928 is received between the recesses 926 and 927. Then the first wrist link 63 returns to its original position.

Likewise, when an excessively large torque is applied on the second wrist link 64, the support shaft 931 tends to rotate together with the second wrist link 64 relative to the output shaft 73 against the return spring 938. In this case, the projection 933 of the flange 932 moves in both the rotational and axial directions along the inclined surface of the recess 937, so that the engagement between the projection 933 and the recess 937 is released, thus allowing the flange 932 and the support shaft 931 to rotate freely. In this case, the flange 932 moves axially against the bias of spring 934 to operate the shock sensor 91 thereby stopping the rotation of the output shaft 73.

When the second wrist link 64 is released from its overloaded condition, the flange 932 rotates reversely by the action of the return spring 938, the projection 933 is received in the recess 937, then the second wrist link 64 returns to its original position.

Thus, when an excessively large force is applied on the wrist portion 6, as when the workpiece W or the clamp device 8 runs against an obstacle, an overload applied in the moving direction of the wrist portion 6 is detected and such overload is absorbed.

As described above, according to the present invention, the first wrist link 63 is extended from the wrist portion 6 to a point on a line of extension of the second arm 4 and the work clamp portion 81, for clamping the workpiece W, is provided at the top end of the first wrist link 63 through the third wrist link 65. Therefore, various advantages are derived from the present invention, in that the operational range of the robot can be enlarged without elongating the second arm 4 and the third arm 5, the third arm 5 and the drive shafts of the wrist portion 6 and the rotary portion 7 need not be elongated, thereby preventing the lowering of the resonance frequency, thus the problem of limitation to the critical number of revolutions taking place at the time of high-speed operation of the robot is eliminated and the robot can have an improved wrist mechanism capable of high-speed operation without the necessity of reinforcing the arms, and with only a small load applied on the T-axis drive motor.

Further, since the damping devices 9 each comprising; the floating mechanisms 92, 93 and the shock sensor 91 are disposed between the wrist portion 6 and the first wrist link 63 and between the rotary portion 7 and the second wrist link 64, respectively, an overload generated in the moving direction of the wrist portion, as when the workpiece or the clamp device touches to an obstacle, is absorbed and detected thereby protecting the wrist portion against the application of the overload thereon.

INDUSTRIAL FEASIBILITY

The present invention can be used in the field of an industrial robot which transfers work between stations in accordance with a programed path.

We claim:

1. A wrist mechanism of an articulated robot, comprising:
   a base plate,
   a base rotatable on the base plate about a vertical rotation axis (S-axis), the base being driven by an S-axis drive motor provided on the base plate;
   a first arm tilting about a horizontally extending pivotal axis (L-axis), the first arm being driven by an L-axis drive motor provided on the base plate;

a second arm tilting about a second horizontally extending pivot axis (U-axis) parallel to the L-axis, the second arm being driven by a U-axis drive motor, the second arm having a root portion adjacent the first arm and having a longitudinal direction;

a third arm rotating about a pivotal axis extending in the longitudinal direction of the second arm (R-axis), the third arm being driven by an R-axis drive motor;

a wrist portion rotating about a pivotal axis (B-axis) arranged perpendicular to the longitudinal direction of the second arm, the wrist portion being driven by a B-axis drive motor provided at the root portion of the second arm;

said wrist portion including an outer peripheral portion and a rotary portion rotating around an axis (T-axis) perpendicular to the B-axis of the wrist portion, the rotary portion being driven by a T-axis drive motor provided at the root portion, said rotary portion having an output shaft; and a work clamp device provided on the wrist portion, said work clamp device including:

- a first wrist link fixed at a first end to the outer peripheral portion of the rotary portion;
- a second wrist link fixed at a first end to the output shaft of the rotary portion;
- a third wrist link pivotally connected at a first end to a second end of the first wrist link;
- a fourth wrist link pivotally connected to a second end of the second wrist link and to a second end of the third wrist link;
- the fourth wrist link being parallel to the first wrist link; and
- a work clamp portion pivotally connected to the third wrist link.

2. A wrist mechanism according to claim 1 wherein said outer peripheral portion is a fixed outer peripheral portion and said output shaft is rotatable relative to said fixed outer peripheral portion, said output shaft being coaxial with said fixed outer peripheral portion.

3. A wrist mechanism according to claim 2 further comprising a first floating mechanism between said outer peripheral portion of said rotary portion and said first wrist link, a second floating mechanism between said output shaft of said rotary portion and said second wrist link, said first and second damping mechanisms preventing application of an excessive large load to said wrist mechanism when said work clamp touches an obstacle.

4. A wrist mechanism according to claim 3 wherein said first floating mechanism includes a casing fixed to the outer peripheral portion of said rotary portion, a slide portion fixed to said first wrist link and axially slidable relative to said casing, a biasing means biasing said slide portion in an axial direction to a first position in which said slide portion is rotatably connected with said casing, said slide portion being slidable from said first position against the bias of said biasing means to a second position which enables relative rotary movement between said casing and said slide portion.

5. A wrist mechanism according to claim 4 wherein said first floating mechanism includes a sensor means operable to detect the second position of said slide portion.

6. A wrist mechanism according to claim 3 wherein said first floating means comprises a return spring operably interposed between said first link and said wrist portion for biasing said first link in a return direction.

7. A wrist mechanism according to claim 6 wherein said second floating mechanism comprises a guide ring fixed to said output shaft of said rotary portion, a support shaft fixed to said second wrist link, engagement means having a first position which effects a rotary connection between said guide ring and said support shaft, said engagement means having a second position which provides for relative rotary movement between said guide ring and said support shaft, said engagement means including biasing means biasing said engagement means into said first engagement position, said engagement means moving from said first position to said second position by overcoming the bias of said biasing means.

8. A wrist mechanism according to claim 7 wherein said second floating mechanism includes a sensor means operable to detect the second position of said engagement means.

9. A wrist mechanism according to claim 3 wherein said second floating mechanism further comprises a return spring operably interposed between said second wrist link and said output shaft of said rotary portion for biasing said second wrist link in a return direction.

* * * * *

UNITED STATES PATENT AND TRADEMARK OFFICE
CERTIFICATE OF CORRECTION

PATENT NO. : 5,580,209
DATED : December 3, 1996
INVENTOR(S) : Masahiro OGAWA et al.

It is certified that error appears in the above-indentified patent and that said Letters Patent is hereby corrected as shown below:

On the Title page, delete "Filed: Mar. 20, 1995", and between "Appln. No.: 397,290" and "Foreign Application Priority Data" insert:

| [22] | PCT Filed: | Aug. 5, 1994 |
| [86] | PCT No.: | PCT/JP94/01300 |
| | § 371 Date: | Mar. 20, 1995 |
| | § 102(e) Date: | Mar. 20, 1995 |
| [87] | PCT Pub. No.: | WO 95/05270 |
| | PCT Pub. Date: | Feb. 23, 1995 |

Signed and Sealed this

Twenty-ninth Day of April, 1997

Attest:

BRUCE LEHMAN

Attesting Officer     Commissioner of Patents and Trademarks